United States Patent Office 3,153,103
Patented Oct. 13, 1964

3,153,103
ONE-STEP POLYETHYLATION OF DI-p-XYLYLENE
Ying L. Yeh, Highland Park, N.J., assignor to Union
  Carbide Corporation, a corporation of New York
No Drawing. Filed Aug. 8, 1962, Ser. No. 215,545
9 Claims. (Cl. 260—671)

This invention relates to a one-step polyethylation process. More particularly, this invention relates to a one-step polyethylation of di-p-xylylenes.

It has formerly been proposed to prepare alkylated poly(p-xylylenes) having the structure

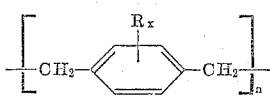

where R is is an alkyl group and $x$ is an integer from 1 to 3 inclusive by the pyrolysis at tempertaures of about 600° C., of an alkylated di-p-xylylene of the structure

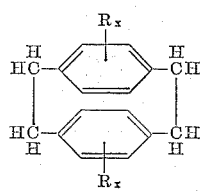

which splits the di-p-xylylene into two reactive diradicals of the formula

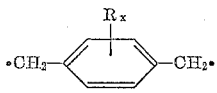

These diradicals then polymerize on condensation into the linear polymer.

The alkylated di-p-xylylene used in such a technique can be made from unsubstituted cyclic di-p-xylylene represented by the structural formula:

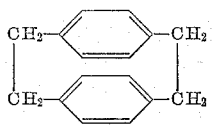

which is stable to most chemical substitution reactions. The chemical behavior of cyclic di-p-xylylenes however cannot usually be predicted on the basis of reactions normally attributed to aromatic compounds. This unpredictability has been attributed to the proximity of the aromatic nuclei with resultant electronic interaction between the $\pi$-electrons of the two benzene rings. In addition, the aromatic nuclei of such compounds are distorted from their normal planar configurations giving rise to a strained and sterically hindered molecule. Molecules possessing such abnormal configurations could well be expected to lead to atypical reactions.

Although prior known processes are capable of producing an alkylated di-p-xylylene having as many as six alkyl ring substituents, they have the disadvantage of being step-wise processes. For example, in order to form a tetraalkylated di-p-xylylene, it is necessary to carry out four separate alkylation steps, each of which must be followed by a separate recovery step to separate and purify the corresponding alkyl derivative. For example it is possible to prepare alkylated di-p-xylylenes by contacting an acylated di-p-xylylene with hydrogen under appropriate conditions whereby the acyl substituent groups can be reduced to the corresponding alkyl groups.

It is also possible to prepare alkylated di-p-xylylenes by the direct reaction of a di-p-xylylene with an alkyl halide in the presence of a catalyst. Although no hydrogen reduction step is required, the reaction is still stepwise in the sense that only one alkyl group is substituted on the di-p-xylylene per reaction sequence.

Both methods have the further disadvantage of requiring quite low reaction temperatures which are difficult to maintain in large scale production.

It has now been found however that polyethylated, di-p-xylylenes can be produced by a one-step direct method. This method, in accordance with the present invention, comprises contacting a di-p-xylylene with a suitable ethylating agent in admixture with boron trifluoride at a temperature of from about 100° C. to 135° C. After the reaction period is essentially completed, the catalyst can be destroyed by addition of dilute aqueous base, such as sodium hydroxide, and the polyethylated reaction product can thereafter be recovered from the organic layer by fractional distillation.

As the di-p-xylylene starting material, either the unsubstituted compound or a di-p-xylylene carrying other ring substituents (e.g. halogen, alkyl groups, etc.), is suitable with the proviso that the total of all groups on the di-p-xylylene product is not more than six. As would be expected from the possible steric effects of substituent groups, it is relatively simple to put three or four ethyl groups on the aromatic nuclei, however, the placement of five and six ethyl groups becomes progressively more difficult. Preferably, the di-p-xylylene starting material contains at least two unsubstituted ring carbon atoms per aromatic nucleus. More particularly preferred is di-p-xylylene per se.

It has been found that conventional ethylating agents are generally not operable in the present process. For example, ethyl chloride and ethyl bromide, although generally effective as ethylating agents, were found to be entirely unsuitable in the present process.

The only ethylating agents which can be employed herein are represented by the general formula

wherein R is a member selected from the group consisting of hydrogen, formyl and lower alkyl groups having no more than two carbon atoms. Examples of such ethylating agents are ethyl formate, diethyl ether, ethanol, methyl ethyl ether, and like others.

Conventionally known Friedel-Crafts catalysts have been found to be generally inoperable for polyethylation of di-p-xylylenes. Aluminum chloride has been found to be too active a catalyst tending to break up the ring structure of di-p-xylylene. Even at very low temperatures, i.e., −5° C. or below, it is not possible to secure polyethylated products with such strong Friedel-Crafts catalysts. Only monoalkylation products result.

The proportion of reactants is not narrowly critical in this invention, but the nature of the final product is dependent upon the stoichiometry of the reaction mixture, i.e., the amount of ethylating agent employed relative to the di-p-xylylene. For example, to form the diethylated di-p-xylylene from unsubstituted di-p-xylylene, two moles of ethylating agent per mole of di-p-xylylene is theoretically required; a large excess of ethylating agent is, however, recommended in order to obtain a better yield of the diethylated product. This stems from the unfavorable order of reactivity which exists in the ethylation of di-p-xylylenes, e.g. mono ethylated di-p-xylylene is less reactive than diethylated di-p-xylylene toward further ethylation. Therefore, a wide variety of ethylation products will be obtained regardless of the amount of ethylating agent employed; however, a large excess of the ethylating agent will insure a better yield of the higher ethylated products. Hence an excess of the ethylating agent over the stoichiometric amount is required and desirable. Preferably the di-p-xylylene and ethylating agent are present respectively in molar ratio between about 1:2 and 1:15.

The minimum concentration of the boron trifluoride catalyst which is employed is dependent upon the amount of ethylating agent present. While an excess of catalyst is usually desirable, the amount of catalyst should not be more than the amount of ethylating agent present. However, the minimum amount of catalyst required is at least one mole per mole of ethylating agent.

It is not considered critical that an inert organic diluent be employed in the reaction. However, as can be seen in the examples provided hereinbelow, employing a diluent has some effect on increasing the yield. Inert diluents such as o-dichlorobenzene, tetrachloroethane, and other such inert organic liquids can be employed provided that the di-p-xylylene reactant is soluble therein at the reaction temperature.

Although not narrowly critical, the reaction temperature range of from about 100° C. to 135° C. is considered important. This being attributed to the fact that at lower temperatures the reaction does not go to completion yielding substantial quantities of monoethylated di-p-xylylene in addition to a large amount of unreacted di-p-xylylene; whereas at substantially high temperatures, highly ethylated di-p-xylylene or low molecular weight polymeric materials predominate.

After the reaction period has been completed, the products can be conveniently isolated by contacting the reaction mass with a dilute aqueous base, such as sodium hydroxide, thereby destroying the catalyst. The organic layer containing the polyethylated products can be separated from the aqueous layer by conventional separatory means and the pure products obtained therefrom by fractional distillation or similar suitable methods.

While not wishing to be bound by any theory or mechanism, it appears that alkylation with Friedel-Crafts catalyst proceed through a carbonium ion mechanism, i.e., the catalyst, which could actually be called a reactant, since it enters into the reaction per se and must be subsequently destroyed, e.g. when NaOH is employed in the present invention a complex such as $BF_3(ONa)$ can be formed, interacts with the alkylating agent to form a complex between the alkylating agent and the catalyst and simultaneously generates an alkyl carbonium ion which is the cationoid electrophile, which in turn is the species that actually attacks the aromatic ring. Therefore, it is readily seen that the reaction mechanism dictates the stoichiometry of the system in that for every mole of alkylating agent employed, a mole of catalyst is required in order to generate the attacking electrophile. While an excess of catalyst is usually desired, the amount of catalyst present should not be more than the amount of alkylating agent present.

Due to the tendency of carbonium ions to undergo rearrangement to their more stable forms, alkyl groups larger than ethyl groups, generally form the more stable, though bulky, secondary or tertiary carbonium ions, which when viewed in connection with the strained and sterically hindered molecular structure of di-p-xylylenes essentially limit the degree of alkylation by the methods of the present invention to ethyl groups which form only primary carbonium ions. Moreover, substitution of larger alkyl groups gives rise to higher molecular weight and therefore higher boiling products which cannot be separated. At the high temperatures required to effect the separation of these higher boiling products, rearrangement of the molecule to its less strained and therefore more stable meta isomer can occur. Thus it is seen that the di-p-xylylene ring system is sensitive to heat and also to the strength of the catalyst employed.

The following examples are illustrative of the present invention but are not intended to serve as any limitation or restriction thereof. All percentages and parts are by weight.

EXAMPLE I

Ethyl Ether and Boron Trifluoride 1.5 grams of di-p-xylylene in solution with 50 ml. of ethereal boron trifluoride was heated to reflux for an hour under anhydrous conditions. The resulting solution which had a dark appearance was cooled to room temperature before being poured into 100 ml. of ice water with vigorous stirring. If necessary, more ether can be added. The ether layer was then separated, washed with dilute sodium hydroxide solution and then with water. The ether solution was dried with sodium sulfate and concentrated to dryness yielding a dark viscous product. Vapor phase chromatographic analysis of the residue gave the following composition: 25% unreacted di-p-xylylene, 22% monoethyl di-p-xylylene, 30% diethyl di-p-xylylene, and 23% higher ethylated products. The unreacted di-p-xylylene portion was removed by filtering the residue dissolved in 5 ml. n-heptane. After the removal of the n-heptane, the residue was subjected to fractional distillation. The fraction boiling at 105° C. to 130° C. (0.04 mm. Hg) was collected and was shown to contain mostly diethyl di-p-xylylene and some of the monoethyl product. Most of the monoethyl di-p-xylylene had precipitated out in the distillate and could easily be removed by filtration. Subsequent fractional distillation of the distillate gave fairly pure diethyl di-p-xylylene (B.P. 127–128° C. at 0.04 mm. Hg).

EXAMPLE II 5 grams of di-p-xylylene was placed in solution with 100 ml. of O-dichlorobenzene and then heated to 100° C. To this heated solution was added sixty-five ml. of ethereal boron trifluoride all at once. The resulting solution was heated at 130° C. for an hour. After the reaction period, the mixture was treated in the same manner as set forth in the previous example (see Example I). Vapor phase chromatographic analysis of the initial crude product indicated the following composition: 23% unreacted di-p-xylylene, 25% monoethyl di-p-xylylene, 32% diethyl di-p-xylylene, and 20% more highly ethylated products.

EXAMPLE III

Ethyl Formate and Boron Trifluoride

To a solution of 5 grams of di-p-xylylene and 65 ml. of ethyl formate in 100 ml. of dischlorobenzene preheated to 100° C. was added a sufficient amount of boron trifluoride to completely saturate the mixture. The resulting mixture was heated to reflux (100° C. to 120° C.) for about an hour. After the reaction period, the mixture was treated in the same manner as shown in Example I. Vapor phase chromotographic analysis of the initial crude product showed: 20% unreacted di-p-xylylene, 25% monoethyl di-p-xylylene, 40% diethyl di-p-xylylene, and 8% more highly ethylated products.

EXAMPLE IV

Ethanol and Boron Trifluoride

To a solution of 5 grams of di-p-xylylene in 65 ml. of absolute ethanol and 100 ml. of dischlorobenzene which had been previously heated to 100° C. was added an excess amount of boron trifluoride. The resulting solution was heated to 130° C. to 135° C. for an hour. After the reaction period, the mixture was treated in the manner set forth in Example I. Vapor phase chromotographic analysis of the crude product showed: 27% unreacted di-p-xylylene, 40% monoethyl di-p-xylylene, 32% diethyl di-p-xylylene, and 1% highly ethylated products.

The ethylated di-p-xylylenes obtainable by the method of the present invention are particularly useful in the preparation of ethylated poly-p-xylylene.

Polymers are prepared by the pyrolysis of these ethylated cyclic dimers at temperatures of 450° C. to 700° C. to cleave the dimer into two reactive diradicals

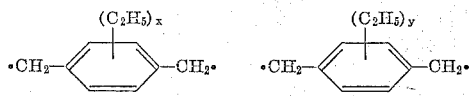

wherein $x$ is a number from 1 to 3, inclusive, and $y$ is a number from 0 to 3, inclusive. It is preferred that temperatures of about 550° C. to 600° C. be used to avoid excess tar and decomposition products at temperatures approaching 700° C. and very low conversion rates at temperatures of 450° C.–500° C. Cooling of the vaporous diradical to temperatures below the ceiling condensation temperature of the ethylated diradical species results in a linear homopolymer. All observed condensation temperatures have been below 200° C. However, cooling the mixture of vaporous diradicals to lower temperatures, i.e., about room temperatures, yields random copolymers. Both homopolymers and copolymers can be classified as tough, high melting, solvent-resistant, linear polymers.

These polymers can be stripped as a film from the condensing surface and used as films, tapes, etc., particularly where high solvent resistance is needed or high use temperatures encountered.

What is claimed is:

1. Process for the preparation of polyethylated di-p-xylylenes which comprises heating a di-p-xylylene in contact with at least a stoichiometric proportion of an ethylating agent having the general formula $$R-O-C_2H_5$$

wherein R is a member selected from the group consisting of hydrogen, formyl, and lower alkyl groups having no more than two carbon atoms, and at least one mole of boron trifluoride per mole of said ethylating agent, at temperatures between about 100° C. to 135° C. and thereafter recovering the polyethylated di-p-xylylene.

2. A process according to claim 1 wherein the ethylating agent is diethyl ether.

3. A process according to claim 1 wherein the ethylating agent is ethanol.

4. A process according to claim 1 wherein the ethylating agent is ethyl formate.

5. Process as defined in claim 1 wherein the di-p-xylylene and ethylating agent are present respectively in molar ratios between about 1:2 and 1:15.

6. Process for the preparation of polyethylated di-p-xylylene which comprises heating a di-p-xylylene in contact with an ethylating agent having the general formula $$R-O-C_2H_5$$

wherein R is a member selected from the group consisting of hydrogen, formyl, and lower alkyl groups having no more than two carbon atoms, said di-p-xylylene and ethylating agent being present respectively in molar ratios between about 1:2 and 1:15, and at least one mole of boron trifluoride per mole of said ethylating agent at temperatures between about 100° C. to 135° C. and thereafter recovering the polyethylated di-p-xylylene.

7. Process as defined in claim 2 wherein the boron trifluoride is present in excess quantities of 20% to 50% based on the stoichiometric proportions with the proviso that the amount of catalyst present does not exceed the amount of ethylating agent present in the reaction mixture.

8. Process as defined in claim 2 wherein an inert organic diluent is employed.

9. Process as defined in claim 8 wherein the inert organic diluent employed is O-dichlorobenzene.

References Cited in the file of this patent

UNITED STATES PATENTS 2,379,368    Matuszak _____ June 26, 1945

FOREIGN PATENTS 1,085,673    Germany _____ July 21, 1960

OTHER REFERENCES

Cram et al.: J.A.C.S., 77, pages 6289–94 (1955).